United States Patent
Vogelsang et al.

[11] Patent Number: 5,657,838
[45] Date of Patent: Aug. 19, 1997

[54] DRIVE UNIT AND METHOD FOR OPERATING A DRIVE UNIT

[75] Inventors: Klaus Vogelsang, Crailsheim; Peter Edelmann, Heidenheim, both of Germany

[73] Assignee: Voith Turbo GmbH & Co. KG, Crailsheim, Germany

[21] Appl. No.: 650,332

[22] Filed: May 20, 1996

Related U.S. Application Data

[62] Division of Ser. No. 401,940, Mar. 10, 1995, abandoned.

[30] Foreign Application Priority Data

Mar. 11, 1994 [DE] Germany ............... 44 08 350.5

[51] Int. Cl.⁶ ............................................. B60T 1/087
[52] U.S. Cl. .............................. 188/154; 188/264 F
[58] Field of Search .......................... 188/243, 296, 188/294, 295, 291, 140, 154; 277/183, 184, 185, 203–204; 303/2

[56] References Cited

U.S. PATENT DOCUMENTS

| | | | |
|---|---|---|---|
| 2,421,056 | 5/1947 | Dake et al. | 188/296 |
| 2,997,144 | 8/1961 | Gsching et al. | 188/154 |
| 3,650,358 | 3/1972 | Bessiere | 188/296 |
| 3,720,372 | 3/1973 | Jacobs | 237/12.3 B |
| 3,951,242 | 4/1976 | Fischer et al. | 188/296 |

FOREIGN PATENT DOCUMENTS

| | | | |
|---|---|---|---|
| 3113408 | 10/1982 | Germany . | |
| 3301560 | 4/1984 | Germany . | |
| 3713580 | 11/1988 | Germany . | |
| 4010970 | 10/1991 | Germany . | |
| 4408349 | 10/1994 | Germany | B60T 1/087 |

*Primary Examiner*—Matthew C. Graham
*Attorney, Agent, or Firm*—Baker & Daniels

[57] ABSTRACT

A drive unit for vehicles with an engine and a gearbox, and with a hydrodynamic retarder. The retarder is in constant drive connection with the engine. The unit includes a coolant circuit whose coolant is at the same time the working medium of the retarder, and the retarder can be utilized as a coolant pump. The retarder is arranged before the gearbox, and the retarder can be united with an engine brake to an overall brake unit (OBU). The overall brake unit is configured such that the retarder can in a braking operation engage sooner than the engine brake.

8 Claims, 3 Drawing Sheets

DRIVE UNIT AND METHOD FOR OPERATING A DRIVE UNIT

This is a division of application Ser. No. 08/401,940, filed Mar. 10, 1995 abandoned.

BACKGROUND OF THE INVENTION

The invention concerns a drive unit for vehicles. The drive unit has an engine and a retarder, wherein the retarder is in constant drive connection with the engine. The coolant in a coolant circuit at the same time comprises the working medium of the retarder, and the retarder can be utilized as a coolant pump. Such a drive unit is known from DE 37 13 580 C1.

While such a drive unit has a number of positive properties, it is solely suited for use at high required overall braking output, notably in sustained braking operation, and with an appropriate expensive configuration, specifically of the retarder and pertaining cooling system.

The problem underlying the invention is to fashion an automotive drive unit wherein, notably in sustained braking operation of a vehicle, a stable braking performance is realized with a concurrent low construction space demand for the individual drive elements, and wherein it is possible to provide a sensitive braking of the vehicle

SUMMARY OF THE INVENTION

This problem is solved by the features of the present invention. Retarders are generally installed in the drive train of the vehicle either in the direction of power flow behind the gearbox as an independent unit, or integrated in a shift gear. According to the present invention, however, the retarder precedes the gearbox, for which reason "retarder" is meant to be understood as a so-called primary retarder which in traction operation precedes the gearbox in the power flow, and whose effect on the driven wheels depends on the shift state.

The intentional combination of a primary retarder operable as a coolant pump with an engine brake system provides several advantages. One of these is the already known advantage of a retarder allowing operation as a coolant pump. Another advantage is that by having the retarder precede the engine brake system, a sensitive adjustment of the braking moment may be made, even at low overall braking output demand.

According to the invention, the retarder is combined with an engine brake in an overall braking unit (OBU) in such a way that the retarder, in terms of time, can engage before the engine brake in a braking operation. In other words, a first braking share is delivered by the retarder and a second braking share by the engine brake system. The size of the latter is preferably so chosen that the two shares account each for one-half of the overall braking output, with the share contributed by the retarder allowing preferably a continuously variable adjustment.

A differentiation is generally required between three cases:

1) the required braking output is less than 50%, based on the available overall braking output which can be delivered by the two brake systems;
2) the required braking output is 50% of the available overall braking output that can be delivered by the two brake system;
3) the required braking output is greater than 50%, based on the available overall braking output that can be delivered by the two brake systems.

In the first case, the overall braking output is delivered solely by the pump retarder. The braking output share delivered by the pump retarder preferably allows a continuously variable adjustment. This can be realized by a suitable design of the drive unit.

In the second case, the braking output is delivered solely by the engine brake system, while in the third case a share of 50% is delivered by the engine brake system and the remaining share by the retarder, preferably continuously adjustable. Preferably, the retarder is configured for maximally 50% of a possibly required overall braking output.

Options for varying the braking moment in braking operation are the utilization of an appropriate valve combination at the retarder outlet, or shifting the stator impeller.

The retarder is preferably filled constantly to capacity. This enables achieving a high braking moment at favorable retarder dimensions, which is reflected in low space demand.

Achieved is an optimum braking performance—especially as regards the stability of the braking operation—, the option of dispensing with a separate coolant circulation pump in the coolant circuit and, thus, saving construction space, the utilization of the retarder as fan drive, as well as the utilization of the accruing heat for heating the passenger compartment, and essentially the avoidance of output losses in nonbraking operation, that is, in traction operation.

BRIEF DESCRIPTION OF THE DRAWINGS

The intentional solution to the problem will be explained hereafter with the aid of the figures, wherein:

FIG. 3b shows a braking output diagram of the embodiment of FIG. 3a.

DETAILED DESCRIPTION OF THE INVENTION

Figure 1A:
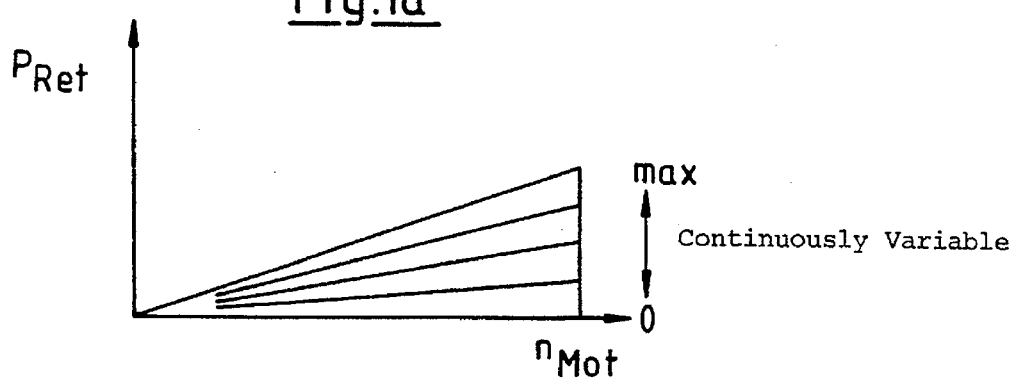
FIGS. 1a through 1d show braking output diagrams of the individual brake systems and of the overall brake system including retarder and engine brake system.
Figure 1B:
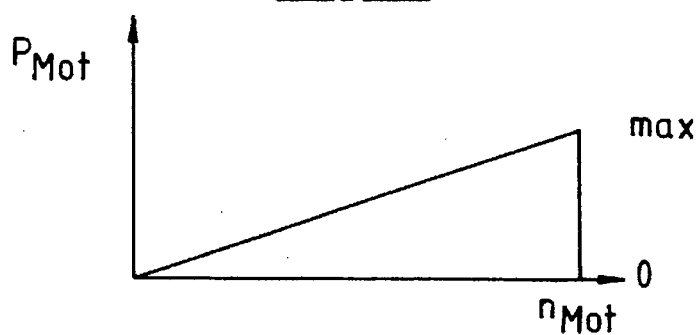

FIGS. 1a and 1b depict possible braking output diagrams of the sustained braking systems of pump retarder and engine brake system. FIG. 1a shows the braking output diagram of a pump retarder, for which purpose the braking output of the pump retarder $P_{ret}$ is plotted over the engine speed $n_{mor}$. The diagram reveals various braking moment characteristics that can be realized:

1) the braking output, or braking moment, at cut-in and cut-out of the pump retarder with a specific degree of filling;
2) the stepped adjustability of the braking moment of the pump retarder by varying the degree of filling or by other construction measures;
3) the continuous adjustability of the braking moment of the pump retarder by varying the degree of filling or by other construction measures, for instance shifting the stator impeller.

The first case is described in the braking output/ engine speed diagram ($P_{ret}$-$n_{mot}$ diagram) only by the curve max and, viewed theoretically, by the X-axis of the diagram. For a specific degree of filling at retarder cut-in, the braking moment characteristic in the diagram corresponds to the one signified max. Retarder cut-out, that is, either in draining or, in pump operation, at a ratio of feed to drain cross section of the retarder of about 1, is described by a braking moment characteristic which, viewed theoretically, corresponds to the X-axis of the diagram.

In the second case, a specific number of different braking moment characteristics between the abscissa of the diagram and the max characteristic for the maximum braking moment can be run with the retarder.

In the third case, every characteristic in the field between the abscissa and the characteristic for the maximum braking moment can be run.

FIG. 1b depicts the braking output available with an engine brake system. Its braking output is normally not continuously variable. Engine brake system cut-in corresponds here to the characteristic max and cut-out to the X-axis, that is, the braking output share of the engine brake system equals zero.

Figure 1C:
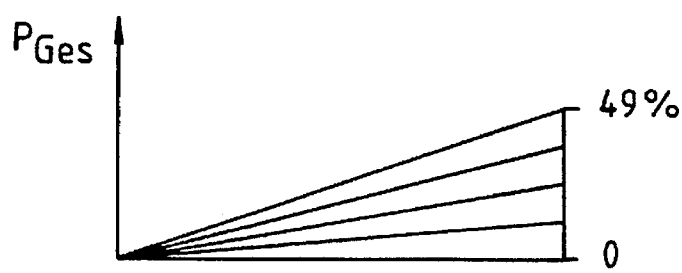

FIG. 1c shows the application of the inventional method of arranging the pump retarder before the engine brake system at an overall braking output demand of less than 50% in an engine speed ($n_{mot}$)/overall braking output diagram ($P_{ges}$). Understood as overall braking output $P_{ges}$ is here the sum of the braking output shares $P_{ret}$ and $P_{mot}$. Since the pump retarder of the invention always precedes the engine brake system in sustained braking operation, the total braking output at a required overall braking output $P_{ges}$<50% is delivered solely by the pump retarder. Plotted in the illustrated braking diagram are the braking output shares of the pump retarder $P_{ret}$ that correspond to the overall braking output $P_{ges}$. The braking output share contributed by the pump retarder is continuously adjustable here from 0% to the required overall braking output. Several output curves are plotted for explanation in the illustrated diagram.

Figure 1D:
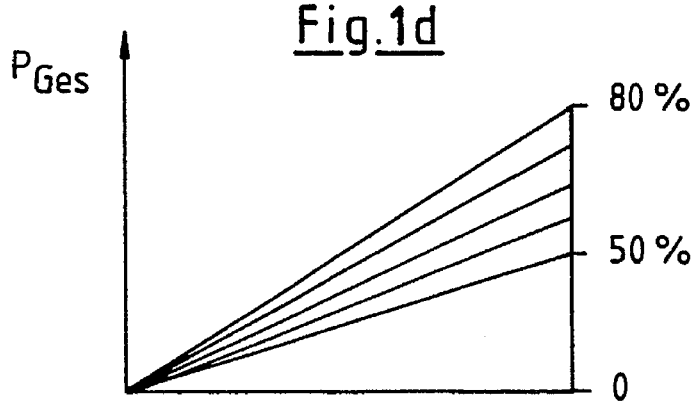

FIG. 1d shows the braking output diagram for the case of a required overall braking output $P_{ges}$ of the sustained braking system that is greater than 50% of the overall braking output $P_{ges}$ of 100% that is available at fully utilized capacity of the two sustained braking systems. The braking output share contributed by the engine brake system is preferably limited to 50% of the overall braking output $P_{ges}$, while the remaining braking output share may be added continuously by the pump retarder. In the illustrated diagram, 50% of an overall braking output of $P_{ges}$=80% is contributed by the engine brake system, while the remaining 30% is added by continuous cut-in of the pump retarder. The output of 50% delivered by the engine brake system, so to speak, allows a black/white cut-in.

Figure 2A:
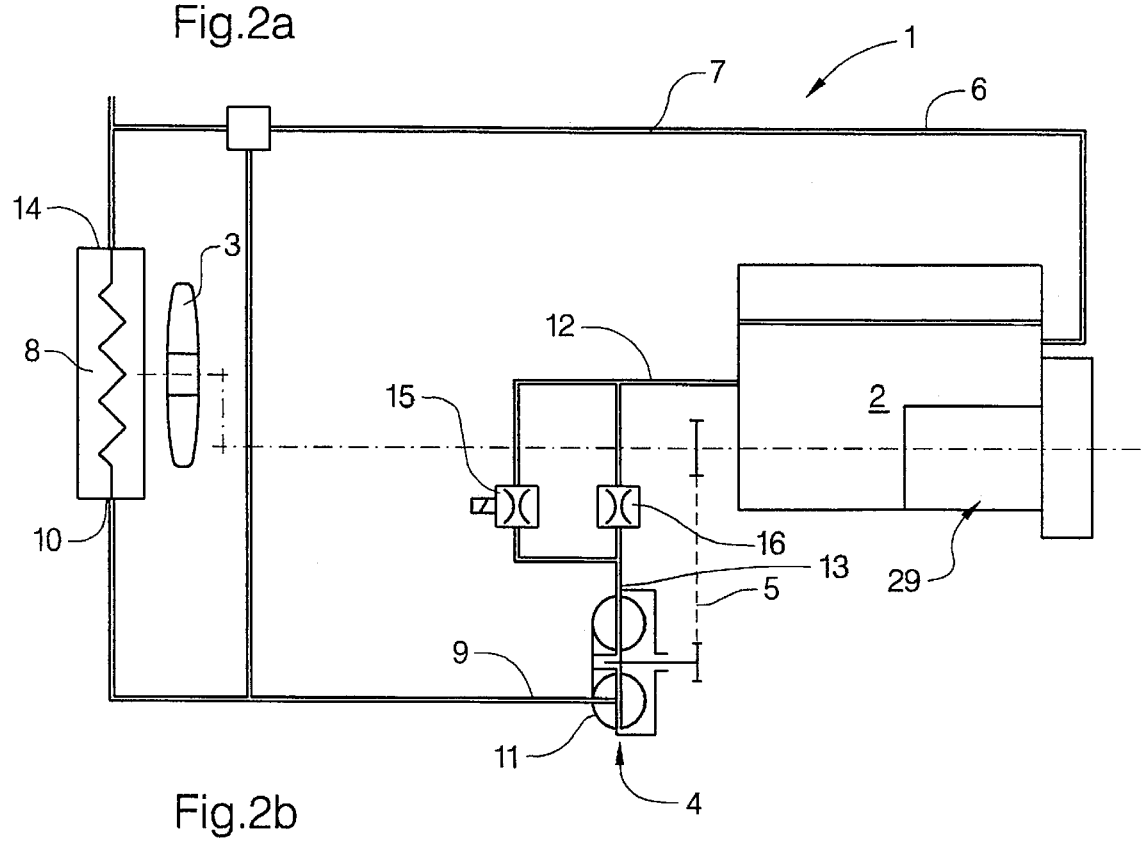
FIG. 2a, shows an inventional drive unit wherein the ratio of feed and drain cross sections of the retarder and the braking moment are varied by means of a valve.
Figure 3A:
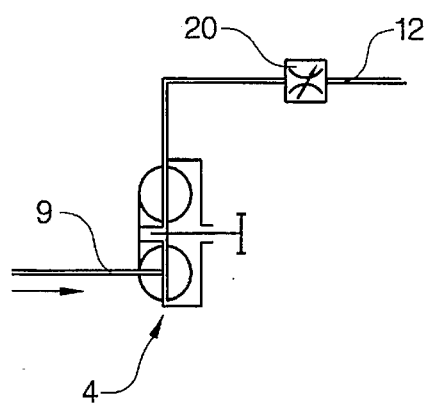
FIG. 3a shows an alternative embodiment wherein the braking moment may be varied by means of a continuously adjustable choke valve.
Figure 4:
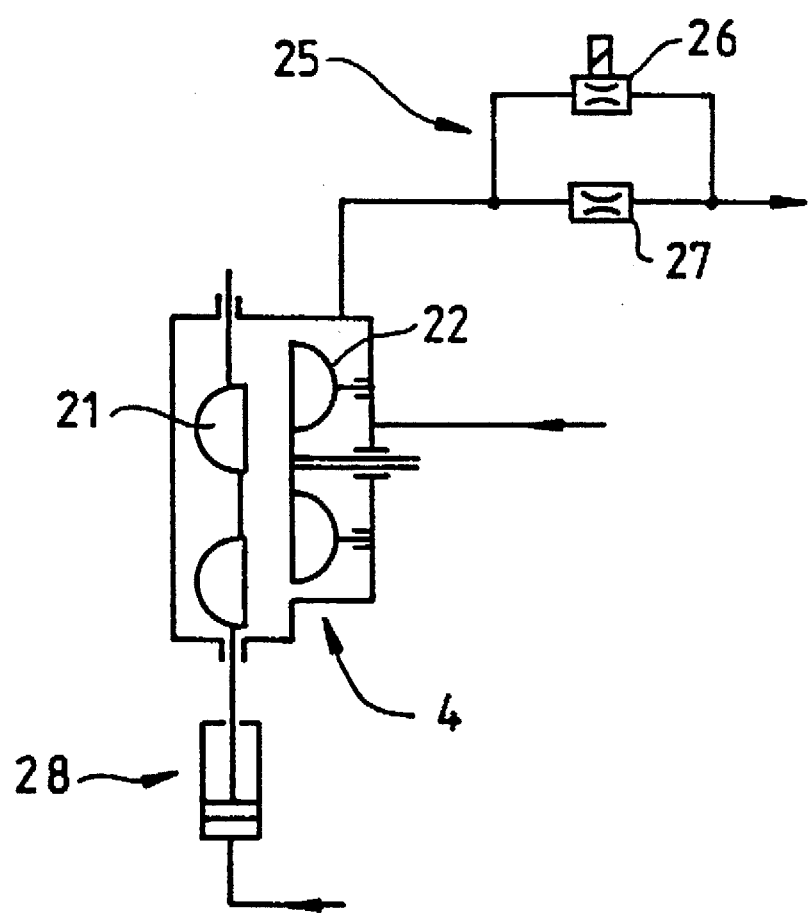
FIG. 4 shows an alternative embodiment wherein the braking moment may be varied by shifting the stator impeller.

FIGS. 2a, 3a and 4 illustrate different designs of a drive unit for controlling the braking moment of a retarder according to DE 44 08 349 A1. Not illustrated in these designs are the necessary control and regulating units and components for realizing the retarder arrangement ahead of the motor brake system.

FIG. 2a shows an embodiment of the inventive drive unit 1 wherein the pump retarder control options are limited to cut-in and cut-out; that is, there is only a single setting available for the braking moment. The drive unit 1 is comprised of an engine 2, which for use in the vehicle is preferably fashioned as an internal combustion engine, a gearbox (not illustrated here) and a retarder 4. The retarder 4 is in constant drive connection with the engine 2, notably its crankshaft, for instance by means of a reduction gear 5. The retarder precedes the gearbox in the direction of power flow. For the arrangement of the retarder on the engine different designs are possible, for realizing the rotationally fixed connection of retarder and engine crankshaft.

Figure 2B:
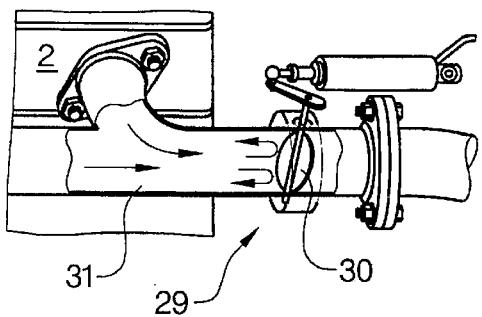
FIG. 2b is a view of the braking system of FIG. 2a, partially cut away, showing portions of the system in greater detail.

Engine 2 and retarder 4 feature a joint cooling circuit 6 whose coolant 7 serves at the same time as the operating fluid of the retarder. The retarder 4 is usable as a coolant pump, for which reason the retarder 4 is signified hereafter as pump retarder 4. Further elements of the vehicle and of the drive unit are not illustrated here. Due to its arrangement before the gearbox, in the direction of power flow, the pump retarder 4 remains in all states of operation coupled to the engine, for which reason it can be utilized also as a circulation pump for the coolant 7, with no power-consuming and heat-generating idling ventilation output accruing in the retarder. Engine braking system 29 is shown in physical relation to engine 2. FIG. 2b shows features of the engine braking system 29 of FIG. 2a in greater detail, illustrating throttle 30 and exhaust or discharge manifold 31.

A cooler 8 with a fan 3 is provided in the coolant circuit 6. The fan 3 can be powered by the engine 2 or, however, also by the retarder 4, but this is not illustrated here. A line 9 extends from the outlet 10 of the cooler 8 to the fluid inlet 11 of the retarder 4, while a line 12 extends from the fluid outlet 13 of the retarder to the fluid inlet 14 of the cooler 8 by way of engine 2.

To realize only a single setting for the braking moment share of the pump retarder, a valve 16 is provided in the line 12 and a switching valve 15 in a pertaining bypass, the two making it possible to provide a maximum flow cross section of line 12 between the fluid outlet 13 of the retarder and engine in a first position of the switching valve 15, while in a second position of the switching valve 15 a choke type constriction becomes effective between retarder 4 and engine 2, causing a heavy resistance on the retarder. To that end, valve 15 is fashioned, e.g., as a two-way valve.

The first switching position corresponds to the nonbraking operation, that is, the pump retarder circulates the coolant 7 in the cooling circuit. The second switching position corresponds to the braking operation, i.e., the pump retarder generates a high braking moment. The ratio between feed and drain cross section to and from the retarder ranges in the braking operation preferably from 4 to 7, in the nonbraking operation from 0.5 to 2. To be understood as feed and drain cross section are also the flow cross sections in the feed and drain lines.

FIG. 3a depicts a section of a drive unit analogous to FIG. 2, but modified for the case of an available continuous adjustment of the braking moment share $P_{ret}$ of the pump retarder. Therefore, the same elements are referenced as before. Only the pump retarder 4 as well as the feed, i.e., the line 9, and the drain from the pump retarder 4 to the engine 2—the line 12—are indicated schematically here. A continuously adjustable choke valve 20 is arranged in the drain line 12. It enables a continuously variable constriction of the flow cross section of line 12 between pump retarder 4 and engine 2. The flow cross section of line 12, or the flow cross section in the valve, allows continuous adjustment from a maximum flow cross section in nonbraking operation up to a very slight flow cross section in braking operation.

The ratio of feed to drain cross section of the retarder, that is, the ratio of flows cross sections of the lines 9 and 12, or the cross sections effected by the valve, is in nonbraking operation preferably 1; that is, both flow cross sections are essentially equal. In braking operation, a ratio between 4 and 7 should preferably be selected, that is, the cross section of the feed is in braking operation 4 to 7 times as large as the drain cross section in braking operation.

Available here as well, however, is the alternative (not illustrated) of arranging the choke valve 20 in the feed, that is, in the line 9. But the cross section of the feed line, that is, line 9, must in this case be chosen 4 to 7 times as large as the cross section of the drain line 12. In the pump operation, the cross section of the feed line needs to be constricted for realizing the required cross-sectional ratio, in order to obtain essentially equal flow cross sections in both lines. In the braking operation, the flow cross section of the feed line, i.e., line 9, needs to be enlarged such that it is 4 to 7 times as large as the flow cross section in the drain, that is, line 12, in order to allow a resistance to be effective on the pump retarder.

Figure 3B:
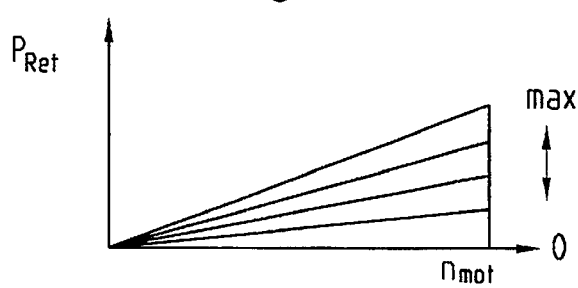

FIG. 3b illustrates in diagram form the continuous adjustability of the braking moment such as can be realized with this type of arrangement.

FIG. 4 depicts a section of a drive unit analogous to FIG. 2, but modified for the case of a possible continuous adjustability of the braking moment share $P_{ret}$ of the pump retarder by shifting the stator impeller. Therefore, the same elements are referenced identically. Indicated schematically here are only the pump retarder 4 and the feed, i.e., line 9, and the drain from the pump retarder 4 to the engine 2—line 12. The braking moment is controlled here by shifting the stator impeller relative to the rotor impeller of the retarder. A valve arrangement 25 serves to switch from nonbraking to braking operation. This valve arrangement includes the valves 26 and 27, with the switching valve 26 arranged in the bypass around valve 27.

The switching valve 26 has two positions. These allow in a first position a maximum flow cross section in the line 12 between retarder fluid outlet 13 and the engine, while in a second position of the switching valve 26 a choke type constriction becomes effective between retarder 4 and engine 2, which causes a heavy resistance at the retarder. To that end, valve 26 is fashioned, e.g., as a two-way valve. Valve 27 is not adjustable.

The first switching position corresponds to the nonbraking operation, that is, the pump retarder circulates the coolant 7 in the cooling circuit. The second switching position corresponds to the braking operation, that is, the pump retarder generates a high braking moment.

In the braking operation, illustrated here, the stator impeller 21 and the rotor impeller 22 are arranged preferably coaxially for the maximum braking moment that can be generated. In the nonbraking operation, the pump retarder circulates the coolant 7 in the coolant circuit 6, due to the rotor impeller rotation. The braking moment in the braking operation is controlled by moving the stator impeller 21 with the aid of suitable means to a position eccentric to the rotor impeller 23, for example with the aid of an actuator 28. Stator impeller shifting options are known from the following documents:

1. DE 31 13 408 C1
2. DE 40 10 970 A1

Therefore, these elements are not addressed further in detail.

The braking output diagram for the braking output share of the retarder corresponds to that described in FIG. 3b.

What is claimed is:

1. A method for operating a drive unit for a vehicle having an engine braking system, the drive unit comprising an engine, a gearbox, a retarder in constant drive connection with the engine, and a cooling circuit having a coolant comprising a working medium of the retarder, the retarder being usable as a pump for the cooling circuit, wherein a maximum possible braking output is deliverable during sustained braking operation, said maximum possible braking output provided jointly by the retarder and the engine braking system, the method comprising:

delivering an overall braking output during a sustained braking operation, said overall braking output comprising a first share and a second share, said first share being provided by the retarder and said second share being provided by the engine braking system;

comparing the overall braking output delivered during the sustained braking operation to a maximum possible braking output of the engine braking system; and when said overall braking output is less than the maximum braking output of the engine braking system, activating the retarder to deliver the overall braking output;

when the overall braking output is greater than the maximum braking output of the engine braking system, activating the engine braking system to deliver the maximum braking output of the engine braking system, and activating the retarder to deliver the difference between the overall braking output and the maximum braking output of the engine braking system.

2. The method of claim 1 wherein each of said first and second shares comprises one-half of the maximum possible braking output.

3. The method of claim 2, wherein the first share of the braking output is continuously variable, and wherein the drive unit includes means for continuously adjusting the first share of the maximum possible braking output.

4. The method of claim 1, wherein the first share of the braking output is continuously variable, and wherein the drive unit includes means for continuously adjusting the first share of the maximum possible braking output.

5. The method of claim 4, wherein the overall braking output further comprises a third share, said first, second and third shares arranged such that the retarder delivers said first share of the overall braking output, the engine delivers said second share, and then the retarder delivers the third share.

6. The method of claim 1, wherein the overall braking output further comprises a third share, said first, second and third shares arranged such that the retarder delivers said first share of the-overall braking output, the engine delivers said second share, and then the retarder delivers the third share.

7. The method of claim 1, wherein when said overall braking output is equal to the maximum braking output of the engine braking system, activating only the engine braking system to deliver the overall braking output.

8. A method for operating a drive unit for a vehicle having an engine braking system, the drive unit comprising an engine, a gearbox, a retarder in constant drive connection with the engine, and a cooling circuit having a coolant comprising a working medium of the retarder, the retarder being usable as a pump for the cooling circuit, wherein a maximum possible braking output is deliverable during a sustained braking operation, said maximum possible braking output provided jointly by the retarder and the engine braking system, the method comprising:

delivering an overall braking output during the sustained braking operation, said overall braking output comprising a first share and a second share, said first share being provided by the retarder and said second share being provided by the engine braking system; said overall braking output being delivered solely by the retarder until reaching a maximum possible output of the engine braking system;

idling said retarder when the maximum possible output of the engine braking system is reached, and activating the engine braking system to deliver said maximum possible output of the engine braking system;

activating the retarder when the maximum possible output of the engine braking system is exceeded during the sustained braking operation to deliver the difference between the desired overall braking output and the maximum possible output of the engine braking system.

* * * * *